No. 793,170. Patented June 27, 1905.

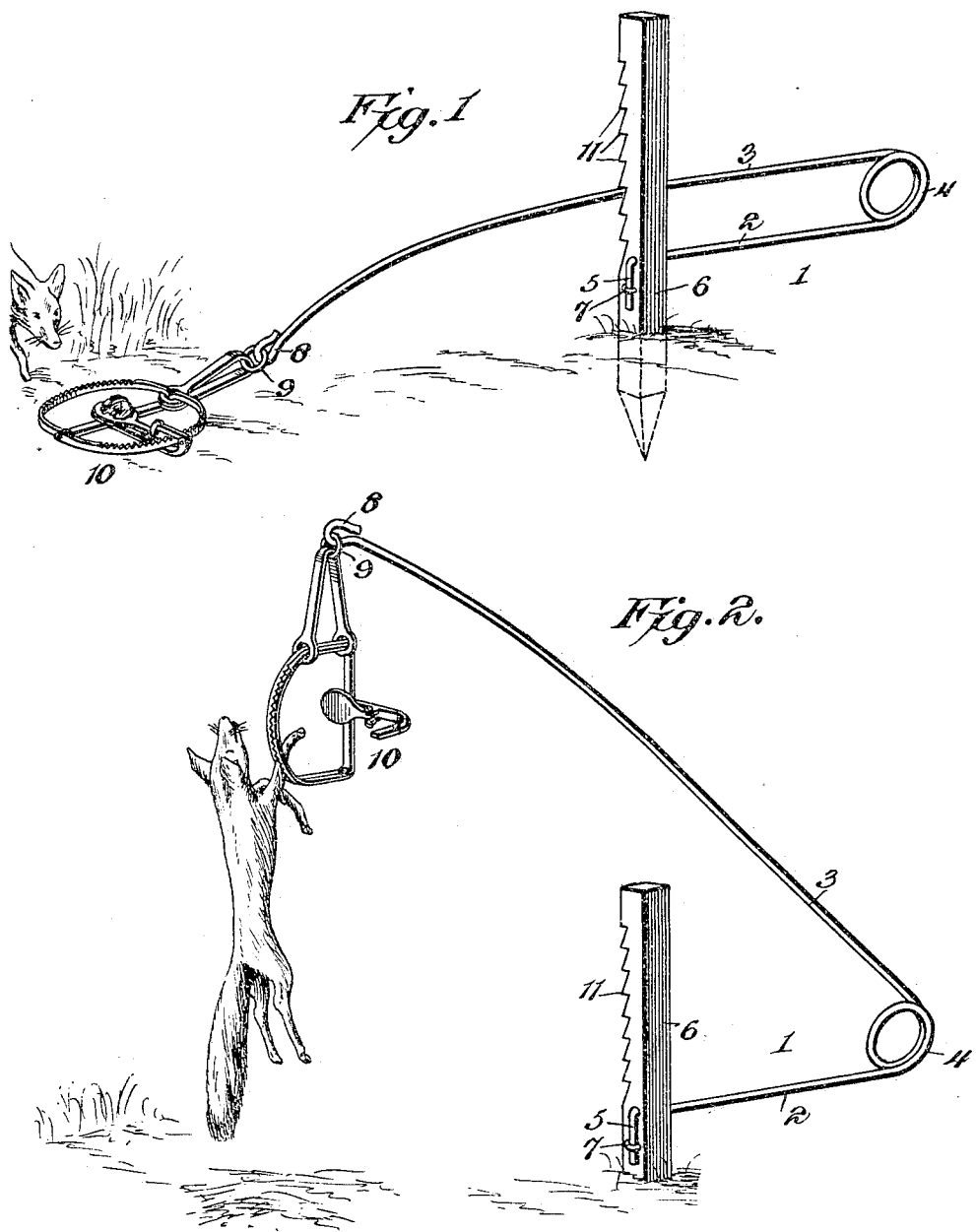

UNITED STATES PATENT OFFICE.

CHARLES BAER, OF MENDON, MICHIGAN.

ATTACHMENT FOR ANIMAL-TRAPS.

SPECIFICATION forming part of Letters Patent No. 793,170, dated June 27, 1905.

Application filed January 21, 1905. Serial No. 242,129.

*To all whom it may concern:*

Be it known that I, CHARLES BAER, a citizen of the United States, residing at Mendon, in the county of St. Joseph and State of Michigan, have invented a new and useful Attachment for Animal-Traps, of which the following is a specification.

The invention relates to an attachment for animal-traps.

The object of the present invention is to provide a simple, inexpensive, and efficient device which will be strong and durable and which when an animal is caught in a trap by its leg will prevent the animal from gnawing off its leg and escaping.

A further object of the invention is to provide a device of this character adapted to be readily applied to all kinds of animal-traps and capable of being sprung by an animal pulling upon the trap in attempting to escape therefrom.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a device constructed in accordance with this invention and shown set. Fig. 2 is a similar view, the device being sprung.

Like numerals of reference designate corresponding parts in both the figures of the drawings.

1 designates a spring composed of two sides or arms 2 and 3 and a connecting-coil 4. The arm 2, which is shorter than the other arm 3, is secured at its end 5 to a post or support 6. The end 5 of the arm 6 may be extended through the post or support and fastened to the same by a staple 7, or it may be secured to the post or support in any other desired manner. The post or support has its lower end pointed to enable it to be readily driven into the ground. The arm 3, which extends a considerable distance beyond the post or support, is provided at its outer end with a hook or eye 8, which is connected by a ring 9 with a trap 10. The trap may be of any desired construction, and the ring forms a flexible connection between the trap and the extended arm of the spring and permits the trap when the attachment is sprung to swing downward to a vertical position, as illustrated in Fig. 2 of the drawings. The post or support is provided at the face, across which the arm 3 extends, with notches, forming teeth 11 for engaging the spring. The teeth may be of any desired number, and the spring is designed to be of sufficient strength to spring a trap upward from the position shown in Fig. 1 to that illustrated in Fig. 2 and to bear the weight of an animal.

Many animals when caught by the leg will gnaw off the same and escape. The device is adapted to prevent this, and as soon as the trap is sprung and the animal attempts to escape the pulling upon the trap will disengage the arm from the teeth of the post or support and the arm will swing upward, carrying the trap and the animal clear of the ground. An animal hanging in such position will be prevented from escaping.

The device is entirely independent in its operation of the operation of the setting and tripping mechanism of the trap, which does not of itself operate the device. Should an animal be killed outright and not attempt to drag the trap, the device will not be sprung.

It will be seen that the device is exceedingly simple and inexpensive in construction, that it is strong and durable, and that it may be readily applied to various forms of animal-traps. Also it will be clear that the post or support may be readily driven into the ground and that the upwardly-swinging arm may be easily set to permit the trap to be arranged in proper position upon the ground. The several teeth of the post or support will permit this adjustment of the trap.

Having thus fully described my invention, what I claim as new, and desire to secure by Letters Patent, is—

1. A device of the class described, comprising a spring having an upwardly-swinging arm adapted to be connected with a trap, and means operable independently of the setting and tripping mechanism of the trap for detachably holding the arm in a depressed position.

2. A device of the class described, comprising a spring having an upwardly-swinging arm adapted to be connected with a trap, and a support carrying the spring and provided with means for detachably engaging the arm to set the same the said arm being operable independently of the setting and tripping mechanism of the trap.

3. A device of the class described, comprising a support provided with teeth, and a spring secured to the support and having an upwardly-swinging arm arranged to detachably engage the teeth, said arm being adapted to be connected to a trap and operable independently of the setting and tripping mechanism of the latter.

4. A device of the class described, comprising a support provided with teeth, and a spring secured to the support and having an upwardly-swinging arm arranged to detachably engage the teeth, and means for flexibly connecting the arm to a trap the former being operable independently of the setting and tripping mechanism of the latter.

5. A device of the class described, comprising a spring composed of two arms, and a connecting portion, one of the arms being extended beyond the other, a post having the shorter arm of the spring attached to it and provided with means for detachably engaging the other arm, and means for connecting the long arm with a trap.

6. In a device of the class described, the combination with a support, and a trap, of an upwardly-swinging spring-actuated arm carrying the trap and arranged to detachably engage the support for operation independently of the setting and tripping mechanism of the trap.

7. In a device of the class described, the combination with a support, and a trap, of an upwardly-swinging spring-actuated arm carrying the trap at one end, and means for connecting the other end of the arm with the support, said arm being detachably engaged between its ends with the support and adapted to be disengaged therefrom for swinging the trap upward.

In testimony that I claim the foregoing as my own I have hereto affixed my signature in the presence of two witnesses.

CHARLES BAER.

Witnesses:
 CLYDE W. FISHER,
 LALAH FISHER.